United States Patent [19]

Lynn, Jr.

[11] Patent Number: 4,889,436
[45] Date of Patent: Dec. 26, 1989

[54] TRANSFER CASE CHAIN ADJUSTMENT

[76] Inventor: Arthur E. Lynn, Jr., Rte. 7, Box 218A, Andalusia, Ala. 36420

[21] Appl. No.: 329,373

[22] Filed: Mar. 27, 1989

Related U.S. Application Data

[63] Continuation-in-part of Ser. No. 251,330, Sep. 30, 1988, abandoned, which is a continuation-in-part of Ser. No. 128,615, Dec. 4, 1987, abandoned.

[51] Int. Cl.⁴ ............................................. F16C 23/10
[52] U.S. Cl. ..................................... 384/447; 384/255; 384/519; 474/112
[58] Field of Search ........................ 384/247, 252–257, 384/254, 447, 490, 519, 537, 542, 583, 585; 474/112

[56] References Cited

U.S. PATENT DOCUMENTS

| | | |
|---|---|---|
| 845,814 | 3/1907 | Pfänder . |
| 1,197,386 | 9/1916 | Morse . |
| 1,206,538 | 11/1916 | Howe . |
| 1,392,439 | 10/1921 | Neuteboom . |
| 1,467,591 | 9/1923 | Riker ............................... 384/255 X |
| 2,057,650 | 10/1936 | Lingren . |
| 2,640,504 | 6/1953 | Blanchard ...................... 474/112 X |
| 2,691,307 | 10/1954 | Pillsbury ............................ 384/255 |
| 2,691,553 | 10/1954 | Pettigrew ........................... 384/447 |
| 3,733,919 | 5/1973 | Rupp, II . |
| 3,888,134 | 6/1975 | Miranda .......................... 384/255 X |

*Primary Examiner*—Thomas R. Hannon
*Attorney, Agent, or Firm*—Kelly O. Corley

[57] ABSTRACT

An adapter assembly for the New Process Model 203 transfer case for four-wheel drive vehicles. The adapter assembly includes a first disc member mountable on the front surface of the forward wall of the principal housing. The first disc comprises a rearwardly extending bearing housing in the plane of the forward wall replacing the original forward bearing for the transfer shaft. A replacement bearing is mounted within the bearing housing on a new axis parallel to and displaced from the original axis of the transfer shaft, permitting continued usage of the chain after the chain would have to have been replaced according to prior practice.

13 Claims, 3 Drawing Sheets

TRANSFER CASE CHAIN ADJUSTMENT

This is a continuation-in-part of copending application Ser. No. 251,330, filed Sept. 30, 1988, which in turn was a continuation-in-part of application Ser. No. 128,615, filed Dec. 4, 1987 now abandoned.

The invention relates to modification so as to permit increased chain life in a New Process Model 203 transfer case for a four-wheel drive vehicle. More particularly, it relates to such a modification which can readily be performed in the field with conventional hand tools, at considerable savings compared to present practice.

The New Process Model 203 transfer case was used in large numbers of four-wheel drive vehicles manufactured by major American manufacturers between 1972 and 1981, to transmit power from a principal drive shaft through sprockets and a silent chain to a transfer shaft when it is desired to drive the front wheels of the vehicle.

After some 30,000 miles of use, however, the chain stretches sufficiently to permit slippage between the chain and the sprockets. When this occurs, although these transfer cases have been in use for many years it is presently necessary to remove the transfer case from the vehicle, disassemble the transfer case, install a new chain and sprockets, reassemble the transfer case, and reinstall the transfer case in the vehicle. This process is inconvenient, needlessly expensive, and requires some 8 hours. There is a long-standing unfilled need for an alternative solution to the problem of stretching chains in these transfer cases.

According to the invention, these and other difficulties with existing practice are avoided by provision of an adapter assembly as hereinafter described.

According to a first principal aspect of the invention, there is provided an assembly for use with a New Process Model 203 transfer case for a four-wheel drive vehicle, the case comprising a principal housing and containing within the principal housing a main drive shaft rotatable about a first axis and a front-wheel transfer shaft rotatable in original forward and rear bearings about an original axis parallel to the first axis and spaced a given original distance therefrom, the transfer case further comprising a first right circularly cylindrical aperture through a planar foward wall of the principal housing, the first aperture being coaxial with the original axis and receiving and supporting the original forward bearing whereby the transfer shaft is supported for rotation about the original axis with the forward end of the transfer shaft extending through the original forward bearing for driving the front wheels of the vehicle, the first aperture being surrounded by four original threaded bolt holes in the forward wall, an assembly for replacing the original forward bearing, the assembly comprising a bearing housing having a right circularly cylindrical outer surface mating with the first aperture whereby the bearing housing is journalled in and guided by the first aperture for selective rotation about the original axis to predetermined angular orientations; the bearing housing having a right circularly cylindrical recess in the plane of the wall and communicating with the interior of the principal housing, the recess having a new axis parallel to the original axis and spaced therefrom. A replacement thrust bearing is mounted within the recess in the plane of the wall whereby the bearing housing and the replacement bearing are rigidly supported in the plane of the wall and radial forces occurring within the replacement bearing are transmitted entirely in the plane of the wall as compressive forces through the bearing housing to the wall. The replacement bearing receives with a press fit and supports the transfer shaft for rotation about the new axis with the forward end of the transfer shaft extending through the replacement thrust bearing for driving the front wheels. Means are provided for retaining the replacement thrust bearing in the plane of the wall, and mounting means are provided for securing the bearing housing at selected ones of the predetermined angular orientations whereby the distance from the primary shaft to the transfer shaft may be selectively adjusted.

According to another aspect of the invention, the mounting means comprises a rigid first disc for mounting on the front surface of the forward wall, the first disc being integral with the bearing housing.

According to another aspect of the invention, the mounting means comprises a plurality greater than four of mounting holes extending through the first disc near the periphery of the first disc and parallel to the original axis, the mounting holes being spaced from one another and from the original axis such that some of the mounting holes align at each of the predetermined angular orientations with the original threaded bolt holes, whereby the first disc may be bolted to the forward wall.

According to another aspect of the invention, the retaining means comprises a shoulder on the first disc abutting the forward surface of the replacement thrust bearing whereby the replacement thrust bearing is prevented from moving forward of the plane of the wall.

According to another aspect of the invention, the retaining means comprises a split retainer ring mounted in an annular groove in the recess and abutting the rear surface of the replacement thrust bearing whereby the replacement thrust bearing is prevented from moving rearward of the plane of the wall.

According to another aspect of the invention, the new axis and the original axis are spaced apart a distance of at least 1.6 mm., and preferably a distance of substantially 4.75 mm.

According to another apsect of the invention, the new axis is lower than the original axis.

According to another apsect of the invention, the assembly further comprises a second rigid disc means for supporting the rear end of the transfer shaft for rotation about the nex axis.

According to another aspect of the invention, the first disc means is provided with 16 equally spaced holes permitting bolting of the first disc to the forward wall, one of the holes being at the three o'clock position.

According to another aspect of the invention, the hole at the three o'clock position is slotted in the clockwise direction.

According to another aspect of the invention, six further successive adjacent holes in the counterclockwise direction from the hold at the three o'clock position are slotted in the clockwise direction.

Other aspects will in part appear hereinafter and will in part be apparent from the following detailed description taken together with the accompanying drawings, wherein.

Figure 1:
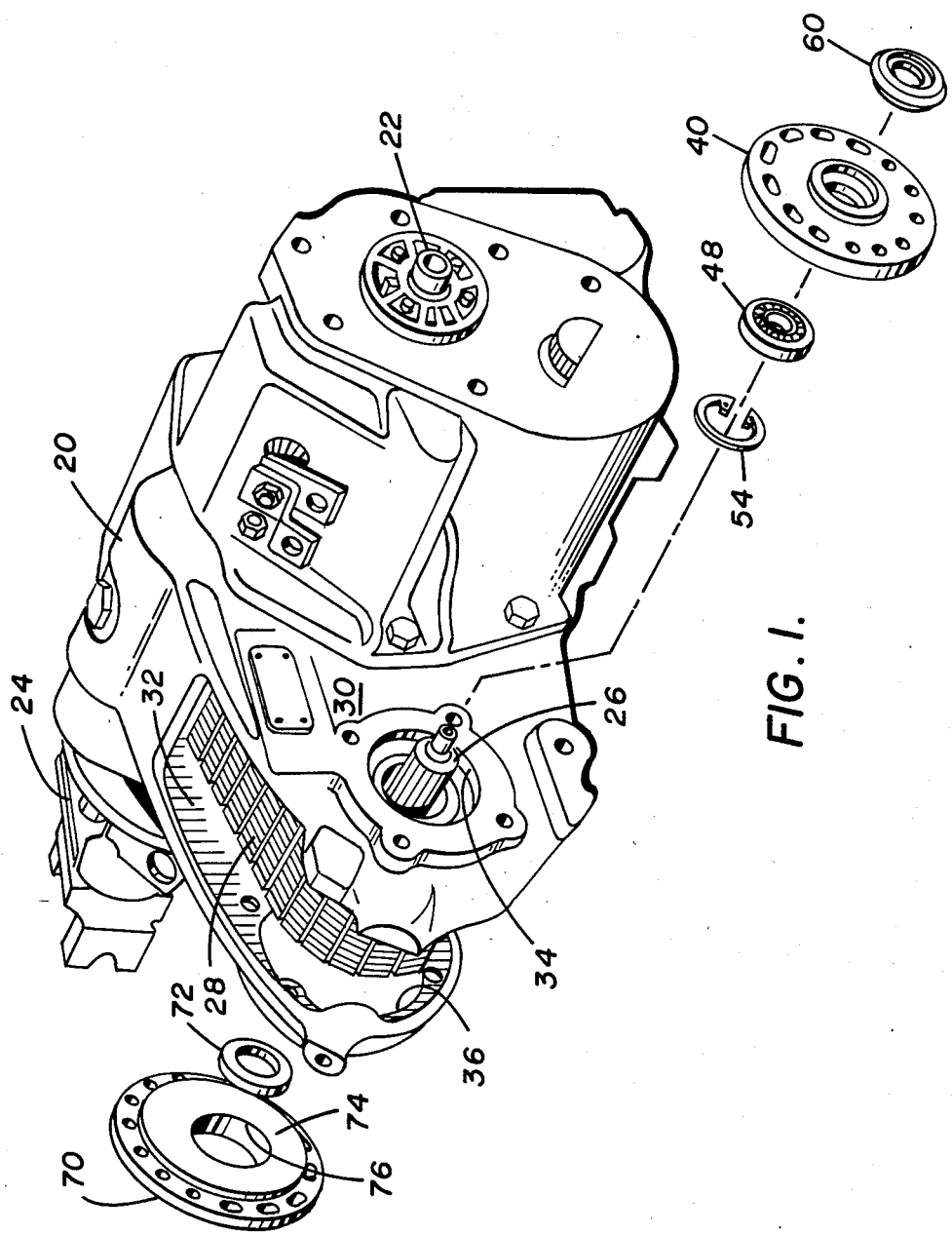
FIG. 1 is a perspective view, partly broken away and with certain parts exploded away, of the New Process model 203 transfer case assembly as modified by the present invention.

As illustrated in FIG. 1, the Model 203 New Process transfer case comprises principal housing 20. Main drive shaft 22 is mounted within principal housing 20 for rotation about a first axis, and drives the rear wheels of the vehicle by means of yoke 24. Main drive shaft 22 drives front-wheel transfer shaft 26 by means of silent chain 28 within principal housing 20.

Principal housing 20 comprises a planar forward wall 30 and a planar rear wall 32. First right circularly cylindrical aperture 34 penetrates forward wall 30, while second right circularly cylindrical aperture 36 penetrates rear wall 32. Four original threaded bolt holes in forward wall 30 surround first aperture 34.

In the original condition of the transfer case, an original forward (non-illustrated) thrust bearing is fitted within aperture 34 and supports transfer shaft 26 for rotation about an original axis coaxial with the axis of aperture 34, with the forward end of transfer shaft 26 extending through the original forward bearing for driving the front wheels of the vehicle. A first non-illustrated plate, secured to the forward surface of wall 30 by bolts threaded into the four original threaded bolt holes, both retained the original forward bearing in position and supported an oil seal through which the forward end of transfer shaft 26 passed. A second non-illustrated plate covered second orifice 36 and supported an original rear bearing for transfer shaft 26, whereby the rear end of transfer shaft 26 was journalled for rotation about the original axis.

According to the present invention, there is provided an assembly for replacing the original forward bearing. The assembly comprises rigid first disc 40, illustrated in FIGS. 1-3. Disc 40 is bolted to forward wall 30 using the four original threaded bolt holes on forward wall 30, and includes integral rearwardly extending bearing housing 42. Housing 42 has a right circularly cylindrical outer surface 44 mating with first aperture 34 and thereby relacing the original forward bearing. Housing 42 and accordingly first disc 40 are thus journalled in and guided by first aperture 34 for selective rotation about the original axis of transfer shaft 26 to predetermined angular orientations.

Right circularly cylindrical recess 46 is formed within bearing housing 42 in the plane of forward wall 30, and extends rearwardly to communicate with the interior of principal housing 20. Recess 46 has a new axis parallel to the original axis of transfer shaft 26 and spaced therefrom as described below.

Replacement thrust bearing 48 (FIG. 1) is mounted within recess 46 in the plane of forward wall 30, receiving with a press fit and supporting transfer shaft 26 for rotation about the new axis and parallel to the original axis. Shoulder 50 on disc 40 abuts the forward surface of replacement bearing 48, thus preventing bearing 48 from moving forward of the plane of forward wall 30. Annular groove 52 in recess 46 is provided for receiving split retainer ring 54 abutting the rear surface of bearing 48, thus preventing bearing 48 from moving rearward of the plane of forward wall 30.

This positioning of replacement bearing 48 and bearing housing 42 in the plane of forward wall 30 results in radial forces occurring in replacement bearing 48 being transmitted entirely in the plane of forward wall 30 as compressive forces through bearing housing 42 to wall 30. This affords maximum rigidity and strength to withstand the high forces experienced by these transfer cases in operation, with no yawing or cocking of the bearing housing in response to such radial forces. It is substantially superior in this regard to constructions wherein the bearing is cantilevered rather than being solidly supported in the plane of the supporting wall.

Seal housing 56 extends forwardly from the plane of disc 40. Cylindrical recess 58 is formed in seal housing 56 and is coaxial with recess 46. Oil seal 60 (FIG. 1) is mounted in recess 58. The forward end of transfer shaft 26 extends through replacement bearing 48 and seal 60 for driving the front wheels of the vehicle.

Replacement bearing 48 must have a smaller outside diameter than the original forward bearing, which had a diameter of about 3.145 inches (about 80 mm.). The preferred replacement bearing is the MRC 107 ball thrust bearing. The preferred seal 60 is the Chicago Rawhide CR 17374. The preferred retainer ring 54 is the Truarc 175000244.

Figure 2:
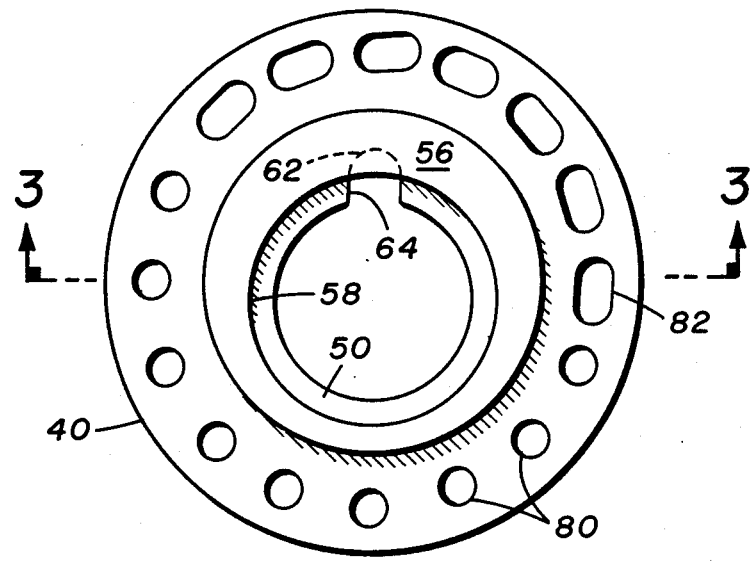
FIG. 2 is a vertical view of the front surface of the disc supporting the front end of the transfer shaft according to the invention.
Figure 3:
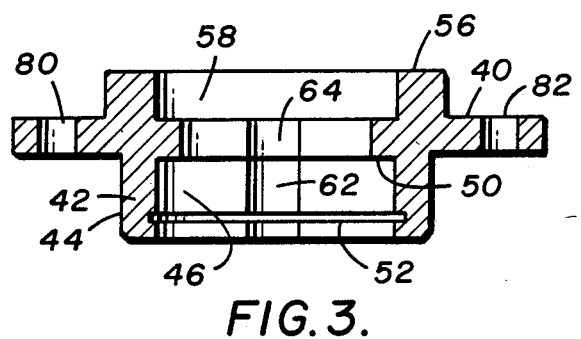
FIG. 3 is a sectional view taken along line 3—3 of FIG. 2.

As illustrated in FIGS. 2 and 3, an optional oil groove 62 is formed in an upper region of recess 46 to assist in maintaining an adequate supply of transmission oil for replacement bearing 48. An extension groove 64 may also be provided in shoulder 50 for the same purpose.

Figure 4:
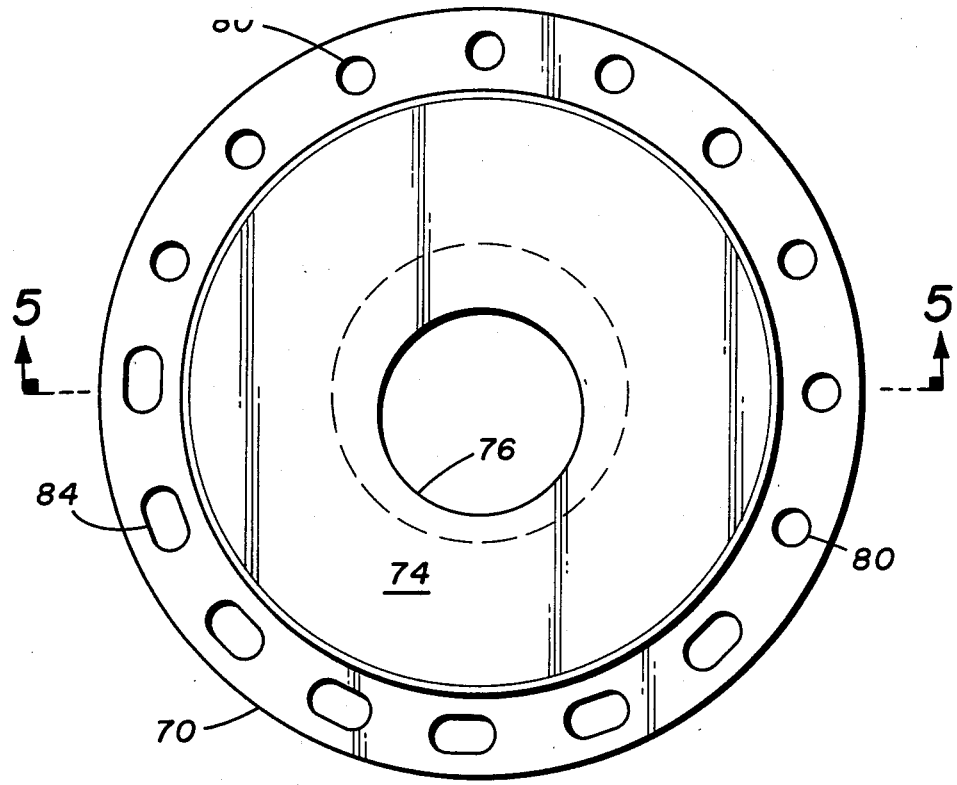
FIG. 4 is a vertical view of the modified disc according to the invention which supports the rear end of the transfer shaft.
Figure 5:
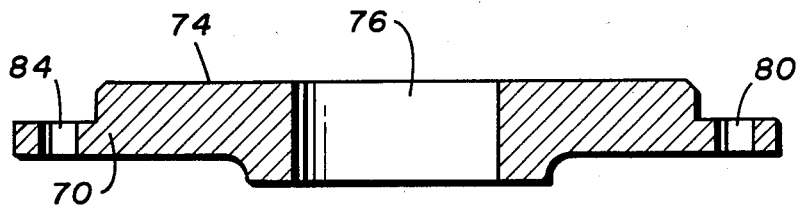
FIG. 5 is a sectional view taken along line 5—5 in FIG. 4.

As illustrated in FIGS. 1, 4, and 5, a second rigid disc 70 is provided as a closure for aperture 36 in rear wall 32 of principal housing 20 and as a support for rear bearing 72. Disc 70 includes forwardly extending shoulder 74 fitting within aperture 36. Right circularly cylindrical recess 76 extends through disc 70 and shoulder 74 and is coaxial with recess 46 (FIG. 3). Bearing 72 is mounted within recess 76, and receives and supports the rearward end of transfer shaft 26 for rotation about the new axis.

To permit the desired adjustment in the preferred embodiment of the invention illustrated, each of discs 40 and 70 is provided with mounting means comprising a plurality greater than four of mounting holes 80 extending through first disc 40 near its periphery and parallel to the original axis of transfer shaft 26. Mounting holes 80 are spaced from one another and from the original axis of transfer shaft 26 such that some of the mounting holes 80 align with the original threaded bolt holes on forward wall 30 at each of the predetermined angular orientations of disc 40, so that first disc 40 may be bolted to forward wall 30. In the preferred embodiment illustrated, there are 16 equally spaced mounting holes provided, four of which align with the original threaded bolt holes at each of the predetermined angular locations.

Mounting holes 80 are sized to permit a ⅜ inch (9.53 mm.) bolt to pass therethrough whereby the discs may be bolted to the respective front and rear surfaces or principal housing 20. As viewed in FIGS. 2 and 4, the new axes are vertically beneath the original axis. Hole 82 in FIG. 2 is defined to be in the three o'clock position as thus viewed. Hole 82 is enlarged in the clockwise direction from its original center to form a slot, as are each of the six consecutive adjacent mounting holes going counterclockwise from hole 82. The preferred degree of enlargement is about 4 degrees as measured from the new axis.

Similarly, the hole above hole 84 in FIG. 4 is defined to be in the nine o'clock position as thus viewed. Hole 84 is enlarged in the clockwise direction from its original center to thereby form a slot, as are five consecutive adjacent holes going counterclockwise from hole 84, and the hole above hole 84. The preferred degree of enlargement is about 5 degrees as measured from the new axis. Provision of the slots as described provides an accommodation for asymmetrical bolt patterns in principal housing 20.

The distance from the original axis of transfer shaft 26 and the new axis is preferably at least 1/16 inch (1.6 mm.), and most preferably about 3/16 inch (4.8 mm.). This latter dimension or offset permits optimum flexibility in adjusting the tension of chain 28.

As thus described, disc 40 in FIG. 2 and disc 70 in FIG. 4 would each be rotated 45 degrees in the counterclockwise direction prior to initial installation on primary housing 20.

In contrast to the prior are practice of replacing the chain, which required some 8 or more hours to accomplish and could not readily be accomplished in the field, the present invention can be installed in the field in less than an hour using only ordinary hand tools.

I claim:

1. For use with a New Process Model 203 transfer case for a four-wheel drive vehicle, said case comprising a principal housing and containing within said principal housing a main drive shaft rotatable about a first axis and a front-wheel transfer shaft rotatable in original forward and rear bearings about an original axis parallel to said first axis and spaced a given original distance therefrom, said transfer case further comprising a first right circularly cylindrical aperture through a planar forward wall of said principal housing, said first aperture being coaxial with said original axis and receiving and supporting said original forward bearing whereby said transfer shaft is supported for rotation about said original axis with the forward end of said transfer shaft extending through said original forward bearing for driving the front wheels of said vehicle, said first aperture being surrounded by four original threaded bolt holes in said forward wall, an assembly for replacing said original forward bearing, said assembly comprising:

(a) a bearing housing having a right circularly cylindrical outer surface mating with said first aperture whereby said bearing housing is journalled in and guided by said first aperture for selective rotation about said original axis to predetermined angular orientations;

(b) said bearing housing having a right circularly cylindrical recess in the plane of said wall and communicating with the interior of said principal housing, said recess having a new axis parallel to said original axis and spaced therefrom;

(c) a replacement thrust bearing mounted within said recess in said plane of said wall whereby said bearing housing and said replacement bearing are rigidly supported in said plane of said wall and radial forces occurring within said replacement bearing are transmitted entirely in said plane of said wall as compressive forces thorugh said bearing housing to said wall;

(d) said replacement bearing receiving with a press fit and supporting said transfer shaft for rotation about said new axis with said forward end of said transfer shaft extending through said replacement bearing for driving said front wheels;

(e) means for retaining said replacement bearing in said plane of said wall; and (f) mounting means for securing said bearing housing at selected ones of said predetermined angular orientations whereby the distance from said primary shaft to said transfer shaft may be selectively adjusted.

2. The assembly defined in claim 1, wherein said mounting means comprises a rigid first disc for mounting on the front surface of said forward wall, said first disc being integral with said bearing housing.

3. The assembly defined in claim 2, wherein said mounting means comprises a plurality greater than four of mounting holes extending through said first disc near the periphery of said first disc and parallel to said original axis, said mounting holes being spaced from one another and from said original axis such that some of said mounting holes align at each of said predetermined angular orientations with said original threaded bolt holes, whereby said first disc may be bolted to said forward wall.

4. The assembly defined in claim 2, wherein said retaining means comprises a shoulder on said first disc abutting the forward surface of said replacement bearing whereby said replacement bearing is prevented from moving forward of said plane of said wall.

5. The assembly defined in claim 2, wherein said retaining means comprises a split retainer ring mounted in an annular groove in said recess and abutting the rear surface of said replacement bearing whereby said replacement bearing is prevented from moving rearward of said plane of said wall.

6. The assembly defined in claim 2, further comprising a second rigid disc means for supporting the rear end of said transfer shaft for rotation about said new axis.

7. The assembly defined in claim 2, wherein said first disc mens is provided with 16 equally spaced holes permitting bolting of said first disc to said forward wall, one of said holes being at the three o'clock position.

8. The assembly defined in claim 7, wherein said hole at said three o'clock position is slotted in the clockwise direction.

9. The assembly defined in claim 8, wherein six further successive adjacent holes in the counterclockwise direction from said hole at said three o'clock position are slotted in the clockwise direction.

10. The assembly defined in claim 1, wherein said new axis and said original axis are spaced apart a distance of at least 1.6 mm.

11. The assembly defined in claim 10, wherein said new axis is lower than said original axis.

12. The assembly defined in claim 1, wherein said new axis and said original axis are spaced apart a distance of substantially 4.75 mm.

13. The assembly defined in claim 12, wherein said new axis is lower than said original axis.

* * * * *